(12) United States Patent
Okumura

(10) Patent No.: US 12,103,123 B2
(45) Date of Patent: Oct. 1, 2024

(54) CONNECTING DEVICE

(71) Applicant: KOSMEK LTD., Kobe (JP)

(72) Inventor: Noriaki Okumura, Kobe (JP)

(73) Assignee: KOSMEK LTD., Kobe (JP)

( * ) Notice: Subject to any disclaimer, the term of this patent is extended or adjusted under 35 U.S.C. 154(b) by 378 days.

(21) Appl. No.: 17/770,743

(22) PCT Filed: Oct. 8, 2020

(86) PCT No.: PCT/JP2020/038166
§ 371 (c)(1),
(2) Date: Apr. 21, 2022

(87) PCT Pub. No.: WO2021/079749
PCT Pub. Date: Apr. 29, 2021

(65) Prior Publication Data
US 2022/0362895 A1 Nov. 17, 2022

(30) Foreign Application Priority Data

Oct. 22, 2019 (JP) ................................ 2019-192367

(51) Int. Cl.
*B23P 19/00* (2006.01)
*B23P 19/04* (2006.01)
*F16B 21/16* (2006.01)

(52) U.S. Cl.
CPC ............ *B23P 19/04* (2013.01); *F16B 21/165* (2013.01)

(58) Field of Classification Search
CPC ............ B23P 19/04; B23P 19/00; B23P 19/10; B23Q 3/00; B23Q 3/06; B23Q 3/154
See application file for complete search history.

(56) References Cited

U.S. PATENT DOCUMENTS

| 4,449,027 A * | 5/1984 | Fujikawa | B23Q 3/1543 219/69.15 |
| 6,152,436 A * | 11/2000 | Sonderegger | B23H 11/003 204/297.06 |
| 9,033,323 B2 * | 5/2015 | Kawakami | B23Q 1/009 269/309 |
| 9,604,330 B2 * | 3/2017 | Lin | B23Q 1/0072 |
| 2010/0219574 A1 * | 9/2010 | Stark | B23Q 1/0072 269/309 |
| 2012/0174351 A1 * | 7/2012 | Haruna | B23Q 1/009 24/463 |

FOREIGN PATENT DOCUMENTS

JP 2014-092180 A 5/2014

OTHER PUBLICATIONS

Search Report dated Dec. 8, 2020, issued in corresponding International application No. PCT/JP2020/038166.

* cited by examiner

*Primary Examiner* — Lee D Wilson
(74) *Attorney, Agent, or Firm* — BACON & THOMAS, PLLC

(57) ABSTRACT

A base plate (21) is attached to a side wall surface of a pallet (P). A connecting rod (22) provided so as to protrude from the base plate (21) is configured to be movable on a surface (21*a*) of the base plate (21). An insertion hole (18) is provided in a housing (1) attached to a robot arm (R), and the connecting rod (22) is inserted in the insertion hole (18). Two pins (23 and 24) extending in parallel to an axial direction of the connecting rod (22) are provided so as to protrude from the base plate (21). The pins (23 and 24) are respectively inserted in support holes (19 and 20) of the housing (1).

12 Claims, 5 Drawing Sheets

CONNECTING DEVICE

TECHNICAL FIELD

The present invention relates to a device configured to detachably connect a second block to a first block.

BACKGROUND ART

Known examples of such a device configured to detachably connect a second block to a first block include a device described in Patent Literature 1 (Japanese Unexamined Patent Publication No. 2014-092180). The known device is structured as follows.

The known connecting device is configured to detachably connect a connecting rod, protruding downward from an under surface of an object to be connected, to a housing of the connecting device. A tubular guide sleeve is inserted in a cylinder hole of the housing so that the movement of the guide sleeve is allowed in a left-right direction but is restricted in an up-down direction (axial direction). A plurality of engagement balls are inserted through a tubular wall of the guide sleeve so as to be movable in a radial direction of a tubular hole of the guide sleeve. The tubular hole of the guide sleeve is communicatively connected to a guide hole provided through an upper wall of the housing. A tubular switch sleeve is fitted over the guide sleeve so as to be movable in the above radial direction. The switch sleeve is provided with, on its inner peripheral wall, a wedge surface configured to push the engagement balls inward in the radial direction. A piston configured to move the switch sleeve in the up-down direction is hermetically inserted between an outer peripheral surface of the switch sleeve and the cylinder hole of the housing so as to be movable in the up-down direction. When connecting the connecting rod to the housing of the connecting device, the connecting rod is inserted in the tubular hole of the guide sleeve through the guide hole and then the piston is moved downward. As a result, the switch sleeve moves the engagement balls inward in the radial direction, to engage the engagement balls with an engaged portion provided at a leading end portion of the connecting rod. The connecting device thus connects the connecting rod to the housing.

CITATION LIST

Patent Literature

Patent Literature 1: Japanese Unexamined Patent Publication No. 2014-092180

SUMMARY OF INVENTION

Technical Problem

The above-described known connecting device is advantageous in that, even if the axis of the connecting rod is misaligned with the axis of the guide hole, the misalignment can be fixed by moving the guide sleeve and the switch sleeve in the radial direction relative to the piston. It is not expected, however, to use such a connecting device in situations in which a stress due to the self-weight of an object to be connected including the connecting rod, that is, a heavy load is applied to the connecting device via the connecting rod. Such a situation can occur, for example, when the connecting device is rotated into a horizontal orientation, in which the axis of the device is not in parallel to a vertical direction, and attached to a side wall of a first block. If the connecting device is used in the horizontal orientation, the connecting rod, to which the load of an object to be connected is applied, strongly pushes or rotates the guide sleeve and/or the engagement balls in one direction in the tubular hole of the switch sleeve. This may create gaps between some of the engagement balls and the engaged portion of the rod, and the load is therefore applied only to the other engagement balls. This decreases the force transmitted from the piston to the connecting rod via the engagement balls.

An object of the present invention is to provide a connecting device capable of firmly connecting an object, even if an external force is applied to the device in a direction crossing its axis.

Solution to Problem

In order to achieve the above object, in an aspect of the present invention, a connecting device configured to detachably connect a first block R and a second block P to each other is structured as follows, for example as shown in FIG. 1 to FIG. 5.

A cylinder hole 2 is provided in a housing 1 to be attached to the first block R. An output member 5 is inserted in the cylinder hole 2 so as to be movable in an axial direction of the cylinder hole 2. A plurality of engagement members 16, 38, which are movable in a radial direction of the cylinder hole 2, are supported by the housing 1 or by the output member 5. The engagement members 16, 38 are moved inward in the radial direction by movement of the output member 5 in the axial direction. An insertion hole 18 opens onto a leading end surface of the housing 1. At least one support hole 19, 20 is provided in the housing 1 so as to extend in parallel to an axial direction of the insertion hole 18. A connecting rod 22 provided so as to protrude from a base plate 21 to be attached to a side wall surface of the second block P is configured to be movable on a surface 21a of the base plate 21. The connecting rod 22 is configured to be insertable into the insertion hole 18. An engaged portion 34 configured to be contactable with the engagement members 16, 38 is provided on an outer peripheral wall of the connecting rod 22 in its circumferential direction. At least one support member 23, 24 is provided so as to protrude from the base plate 21 in parallel to an axial direction of the connecting rod 22. The support member 23, 24 is configured to be inserted in the support hole 19, 20.

In the above aspect of the present invention, the following functions and effects are provided.

The support member is provided so as to protrude from the base plate of the connecting device, while the connecting rod is provided so as to protrude and to be movable on the surface of the base plate. Due to this, when the connecting device is used in the horizontal orientation, a vertically downward load due to the self-weight of the second block or the like is received by the support member, and is not applied to the connecting rod because the connecting rod is movable on the surface of the base plate. As a result, the driving force of the output member is reliably transmitted to the connecting rod via the balls, even if an external force is applied to the second block.

It is preferable to incorporate the following features (1) to (5) into the above-described connecting device.

(1) As shown in FIG. 1 to FIG. 4, for example, a tubular support member 14 is provided in the cylinder hole 2 so as to protrude from a leading end wall 1b of the housing 1 toward a base end side in the axial direction. Guide holes 15 are bored through a tubular wall of the support member 14 in the radial direction of the cylinder hole 2. The engagement members 16 are respectively inserted in the guide holes 15 so as to be movable in the radial direction. A wedge portion 17 configured to be contactable with the engagement members 16 is provided on an inner peripheral wall of the output member 5. The insertion hole 18, structured by a tubular hole of the support member 14, opens onto the leading end surface of the housing 1.

This arrangement makes it possible to reliably transmit the driving force of the output member to the connecting rod via the balls.

(2) As shown in FIG. 5, for example, a portion of the output member 5 has a tubular shape, and guide holes 37 are bored through a tubular wall of the output member 5 in the radial direction of the cylinder hole 2. The engagement members 38 are respectively inserted in the guide holes 37 so as to be movable in the radial direction. A wedge portion 39 configured to be contactable with the engagement members 38 is provided on an inner peripheral wall of the cylinder hole 2.

This arrangement makes it possible to reliably transmit the driving force of the output member to the connecting rod via the balls.

(3) As shown in FIG. 1 to FIG. 5, for example, the at least one support member 23, 24 includes a first support member 23 and a second support member 24, which are provided so as to protrude from the base plate 21 with the connecting rod 22 interposed between the first and second support members 23 and 24. The at least one support hole 19, 20 includes a first support hole 19 with a circular hole shape, into which the first support member 23 is to be inserted, and a second support hole 20 with a circular hole shape, into which the second support member 24 is to be inserted. The first support member 23 has a cylindrical outer peripheral wall; and the second support member 24 has projecting portions 24a respectively provided on both sides of a cylindrical outer peripheral wall of the second support member 24 in a direction crossing a direction connecting the first support member 23 to the second support member 24.

This arrangement allows the second support member to move within the second support hole in the direction connecting the first support member to the second support member, even if there is a difference between (i) the distance between the first support hole and the second support hole and (ii) the distance between the first support member and the second support member. Furthermore, when the connecting device is used in the horizontal orientation, the vertical load acting on the second block is received by the first block via the projecting portions and via the second support hole.

(4) The at least one support member 23, 24 includes a first support member 23 and a second support member 24, which are provided so as to protrude from the base plate 21 with the connecting rod 22 interposed between the first and second support members 23 and 24. The at least one support hole 19, 20 includes a first support hole 19 with a circular hole shape, into which the first support member 23 is to be inserted, and a second support hole 20 with a circular hole shape, into which the second support member 24 is to be inserted. The first support member 23 has a cylindrical outer peripheral wall. The second support member 24 has an oval prism shape, a longitudinal axis of an oval of the oval prism shape extending in a direction crossing a direction connecting the first support member 23 to the second support member 24.

This arrangement allows the second support member to move within the second support hole in the direction connecting the first support member to the second support member, even if there is a difference between (i) the distance between the first support hole and the second support hole and (ii) the distance between the first support member and the second support member. Furthermore, when the connecting device is used in the horizontal orientation, the vertical load acting on the second block is received by the first block via the second support member of the oval prism shape and via the second support hole.

(5) The at least one support member 23, 24 includes a first support member 23 and a second support member 24, which are provided so as to protrude from the base plate 21 with the connecting rod 22 interposed between the first and second support members 23 and 24. The at least one support hole 19, 20 includes a first support hole 19 with a circular hole shape, into which the first support member 23 is to be inserted, and a second support hole 20 with an elongated hole shape, into which the second support member 24 is to be inserted, a longitudinal axis of the elongated hole shape extending in a direction connecting the first support hole 19 to the second support hole 20. Each of the first support member 23 and the second support member 24 has a cylindrical outer peripheral wall.

This arrangement allows the second support member to move within the second support hole in the direction connecting the first support hole to the second support hole, even if there is a difference between (i) the distance between the first support hole and the second support hole and (ii) the distance between the first support member and the second support member. Furthermore, when the connecting device is used in the horizontal orientation, the vertical load acting on the second block is received by the first block via the second support member and via the oval second support hole.

Advantageous Effects of Invention

According to embodiments of the present invention, it is possible to provide a connecting device capable of firmly connecting an object, even if an external force is applied to the device in a direction crossing the axis of the device.

DESCRIPTION OF EMBODIMENTS

Figure 1:
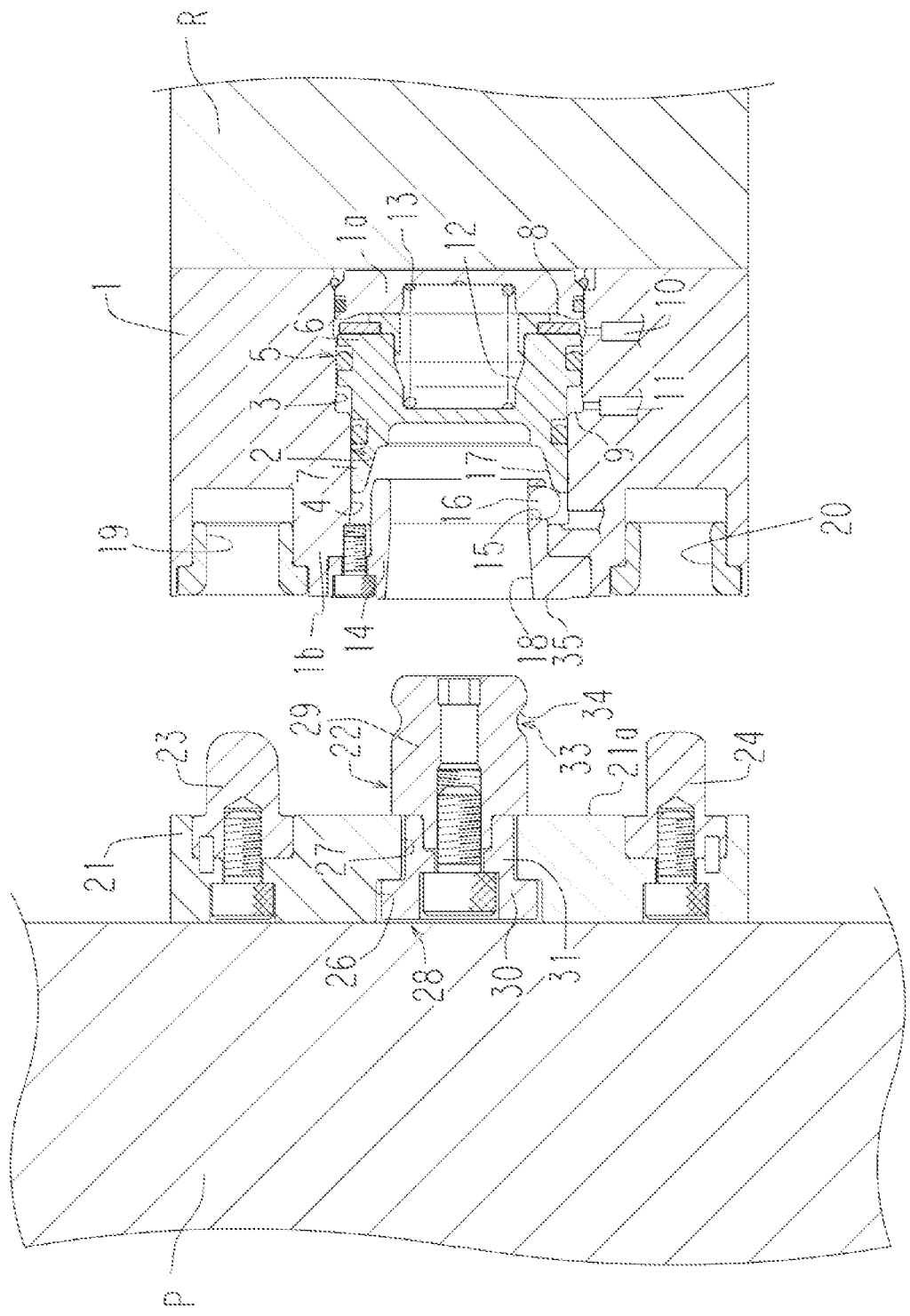
FIG. 1 shows a first embodiment of the present invention, and is a plan view in section of a connecting device (a cross section of the device viewed from the top), illustrating a state in which a robot arm and a pallet are detached from each other.
Figure 2:
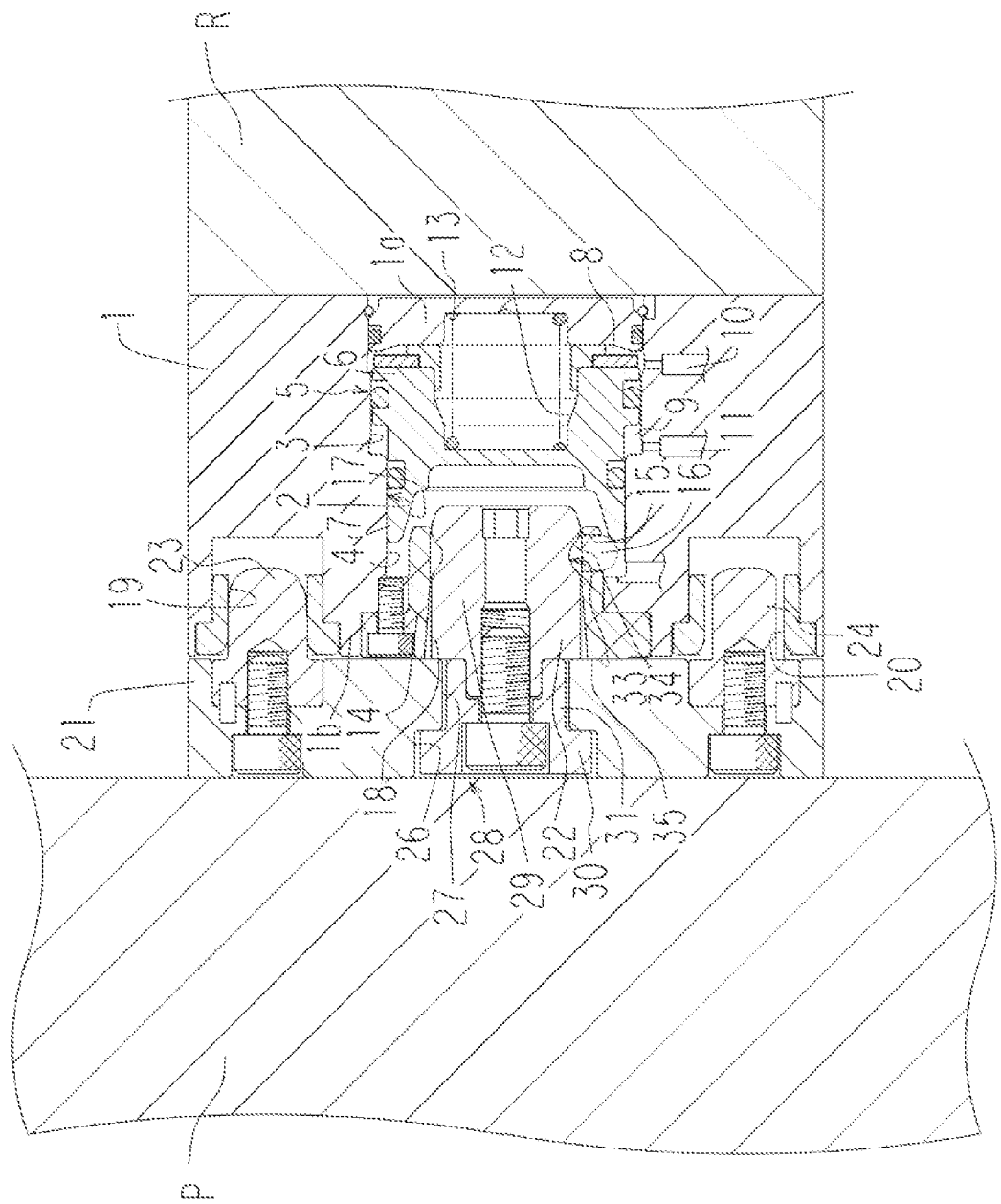
FIG. 2 is a plan view in section (a top view cross section) of the connecting device in a release state, and is a diagram similar to FIG. 1.
Figure 3:
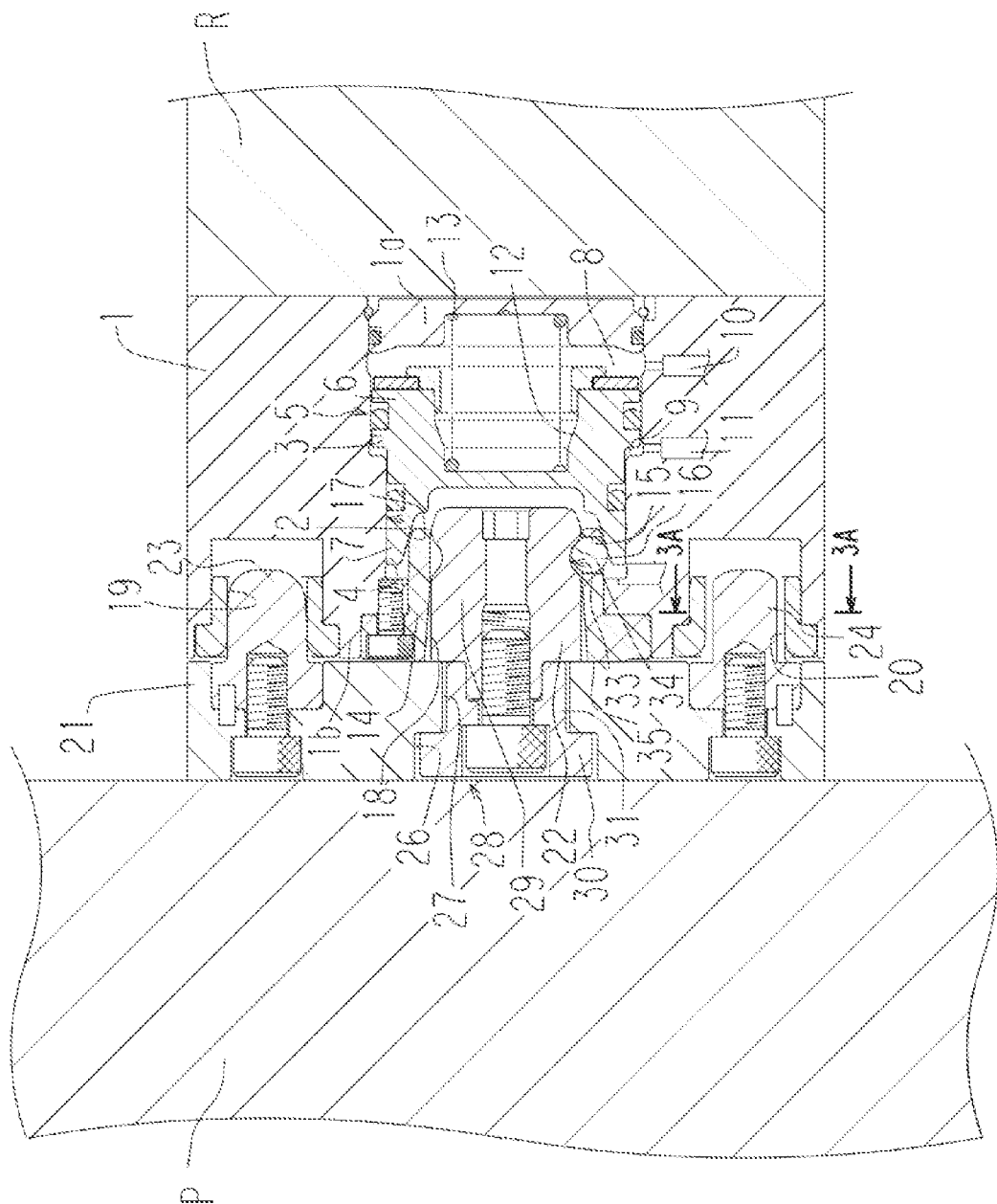
FIG. 3 is a plan view in section (a top view cross section) of the connecting device in a lock state, and is a diagram similar to FIG. 1.

FIG. 1 to FIG. 3 show a first embodiment of the present invention. This embodiment deals with, by way of example, a connecting device to be attached to a leading end portion of a robot arm R of an articulated robot. The connecting device is configured to detachably connect a pallet P to the leading end portion of the robot arm R. First of all, the structure of the connecting device will be described with reference to FIG. 1. It should be noted that the left and right in the following description respectively refer to the left and right in the drawings.

A housing 1 of the connecting device is attached, in a left-right direction, to the left end portion (leading end portion) of the robot arm R (first block). The housing 1 has a cylinder hole 2 bored in the left-right direction. The cylinder hole 2 has a large-diameter hole 3 and a small-diameter hole 4, which are arranged in this order from the right to the left. A piston portion 6 of an output member 5 is hermetically inserted in the large-diameter hole 3 so as to be movable in the left-right direction. An operation portion 7 of the output member 5 is hermetically inserted in the small-diameter hole 4. A lock chamber 8 is provided to the right of the output member 5, and a release chamber 9 is provided between the large-diameter hole 3 and the operation portion 7. A supply and discharge passage 10 through which compressed air is supplied to and discharged from the lock chamber 8 is provided in the housing 1. Furthermore, a supply and discharge passage 11 through which compressed air is supplied to and discharged from the release chamber 9 is provided in the housing 1. An attachment hole 12 is provided in a right portion of the output member 5, and a holding spring 13 is attached in the attachment hole 12. The holding spring 13 biases the output member 5 leftward relative to a right wall (base end wall) 1a of the housing 1.

The above-described connecting device is provided with a tubular support member 14 protruding rightward from a left wall (leading end wall) 1b of the housing 1 into the cylinder hole 2. Three guide holes 15 are bored through a tubular wall of the support member 14 in its radial direction. FIG. 1 to FIG. 3 each shows one of the three guide holes 15. A ball (engagement member) 16 is inserted in each of the guide holes 15 so as to be movable in the radial direction. An inner peripheral surface of the operation portion 7 of the output member 5 is arranged so that the distance in the radial direction between the surface and an axis of the cylinder hole 2 increases toward the left in the axial direction. The balls 16 are contactable with a wedge surface (wedge portion) 17 provided on the inner peripheral wall.

An insertion hole 18, structured by a tubular hole of the support member 14, is provided through the left wall 1b of the housing 1. The insertion hole 18 is communicatively connected to the cylinder hole 2 through the tubular hole of the support member 14. As shown in FIG. 1, support holes 19 and 20 are bored so as to extend in parallel to the axial direction of the insertion hole 18. The support holes 19 and 20 are disposed at predetermined intervals with the insertion hole 18 interposed therebetween.

A connecting rod 22 and two pins (support members) 23 and 24 are provided so as to protrude rightward (in a horizontal direction) from a base plate 21 and so as to be in parallel to one another. The base plate 21 is to be attached to a right wall surface of the pallet (second block) P. A through hole is bored through the base plate 21 in the left-right direction and the connecting rod 22 is inserted in the through hole. The through hole has a large-diameter hole 26 and a small-diameter hole 27, which are arranged in this order from the left to the right. The small-diameter hole 27 has a diameter smaller than that of the large-diameter hole 26. The connecting rod 22 has a base end portion 28 and a leading end portion 29, which are arranged in this order from the left to the right. The base end portion 28 has: a large-diameter portion 30 inserted in the large-diameter hole 26 of the through hole; and a small-diameter portion 31 inserted in the small-diameter hole 27 of the through hole. The diameter of the large-diameter hole 26 is designed to be larger than the diameter of the large-diameter portion 30. The diameter of the small-diameter hole 27 is designed to be larger than that of the small-diameter portion 31. The diameter of the small-diameter hole 27 is designed to be smaller than that of the large-diameter portion 30. This allows the connecting rod 22 to be movable on a right surface (surface) 21a of the base plate 21 while preventing the connecting rod 22 from coming out rightward from the through hole. The depth of the small-diameter hole 27 is slightly longer than the size of the small-diameter portion 31 in the left-right direction. The difference is as small as a clearance for fitting. Due to this, a peripheral wall of the small-diameter hole 27 is sandwiched by a left end surface of the leading end portion 29 and a right end surface of the large-diameter portion 30.

The pins 23 and 24 are disposed with the connecting rod 22 interposed therebetween. The pins 23 and 24 are provided so as to protrude rightward (in the horizontal direction) in parallel to the axial direction of the connecting rod 22, and are fixed by screws from the left side of the base plate 21. The length of the protruding portion of each of the pins 23 and 24 is designed to be shorter than that of the connecting rod 22. The leading end portion of each pin 23, 24 has a spherical shape.

Figure 4:
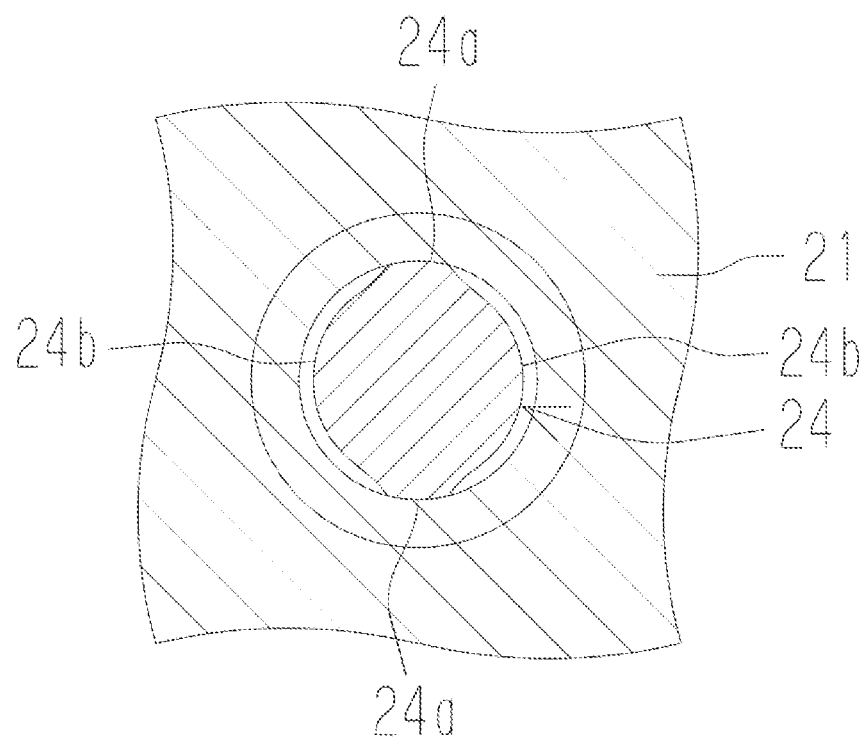
FIG. 4 is a cross section taken along a line 3A-3A in FIG. 3, and shows a part of the connecting device viewed from the front.

The pin 23 (first support member) has a cylindrical outer peripheral wall and is inserted in the support hole 19 (first support hole) with a clearance for fitting. To the contrary, the pin 24 (second support member) has: projecting portions 24a provided respectively on upper and lower portions of its outer peripheral wall and protruding in the radial direction of the pin 24; and relief portions 24b provided between the two projecting portions 24a, as shown in FIG. 4. That is, the pin 24 has the projecting portions 24a provided on both sides of its cylindrical outer peripheral wall with respect to a direction crossing (in this embodiment, to a direction orthogonal to) a direction connecting the pin 23 to the pin 24. Each of the support holes 19 and 20 has a circular hole shape, i.e., has a circular cross section. This allows the pin 24 to move in the horizontal direction within the support hole 20, even if there is an error in size between (i) the distance between the support holes 19 and 20 and (ii) the distance between the pins 23 and 24. Furthermore, a vertical load acting on the second block P is received by the first block R via the projecting portions 24a and via the support hole 20.

Instead of providing the projecting portions 24a and the relief portions 24b on the outer peripheral wall of the pin 24, the pin 24 may be arranged to have an oval prism shape, the longitudinal axis of which oval shape extends in a direction crossing (e.g., orthogonal to) the direction connecting the pin 23 to the pin 24. An oval or oval shape encompasses an elliptical shape, an oblong or elongated circular shape, and an ovoid shape. The oval prism shape means a prism shape with an elliptical, oblong or elongated circular, or ovoid cross section. Also in this case, the pin 23 has a cylindrical outer peripheral wall, similarly to that in the above embodiment. Each of the support holes 19 and 20 also has a circular hole shape, i.e., has a circular cross section.

Alternatively, the following arrangement is also possible: the pin 24 is arranged to have a cylindrical shape like the pin 23; and the support hole 20 is arranged to have an elongated hole shape, the longitudinal axis of which elongated shape extends in the direction connecting the support hole 19 to the support hole 20 (i.e., its cross section is long in the horizontal direction). In this case, the support hole 19 has a circular hole shape, i.e., has a circular cross section, similarly to that in the above embodiment.

The connecting rod 22 is insertable in the insertion hole 18. Furthermore, the pin 23 is insertable in the support hole 19, and the pin 24 is insertable in the support hole 20. An engaged groove 33 is provided in a circumferential direction on an outer peripheral wall of the connecting rod 22. An engaged portion 34 is provided on a peripheral wall of the engaged groove 33. The engaged portion 34 is designed so that the distance between the engaged portion 34 and the axis of the connecting rod 22 decreases leftward (the diameter of the engaged portion 34 decreases leftward). The balls 16 are configured to be engageable with the engaged portion 34.

The above-described connecting device operates as follows, as shown in FIG. 1 to FIG. 3.

In an initial state (release state) of the connecting device, which is shown in FIG. 1, compressed air has been discharged from the lock chamber 8 and compressed air has been supplied to the release chamber 9. Due to this, a rightward pushing force corresponding to the pressure of the compressed air in the release chamber 9 is exerted onto the output member 5 so as to move the output member 5 rightward against the biasing force of the holding spring 13. This allows the balls 16 to move outward in the radial direction in the respective guide holes 15.

As the robot arm R in the release state shown in FIG. 1 is moved leftward, the insertion hole 18 of the housing 1 is fitted over the connecting rod 22 of the pallet P from the right, while the support holes 19 and 20 are fitted over the pins 23 and 24, respectively, as shown in FIG. 2.

To cause the connecting device to transition from the release state shown in FIG. 2 to a lock state shown in FIG. 3 for locking, compressed air in the release chamber 9 is discharged and compressed air is supplied to the lock chamber 8. As a result, the output member 5 is at first moved leftward by the resultant of: a force of the compressed air in the lock chamber 8 pushing the output member 5 leftward; and the leftward biasing force of the holding spring 13. Subsequently, the wedge surface 17 of the operation portion 7 moves the balls 16 inward in the radial direction, and the balls 16 are brought into contact with the engaged portion 34 of the connecting rod 22. Then, as the output member 5 pulls the connecting rod 22 rightward via the balls 16, the right surface 21a of the base plate 21 is pressed against a seating surface 35 of the housing 1. In this way, the connecting device transitions from the release state shown in FIG. 2 to the lock state shown in FIG. 3.

To cause the connecting device to transition from the lock state shown in FIG. 3 to the release state shown in FIG. 2 for releasing, compressed air in the lock chamber 8 is discharged and compressed air is supplied to the release chamber 9. As a result, the output member 5 is at first moved rightward by the force of the compressed air in the release chamber 9 pushing the output member 5 rightward, against the leftward biasing force of the holding spring 13. Subsequently, gaps are created between the wedge surface 17 of the operation portion 7 and the balls 16, and this allows the balls 16 to move outward in the radial direction. In this way, the connecting device transitions from the lock state shown in FIG. 3 to the release state shown in FIG. 2.

The above-described embodiment provides the following advantages.

In the connecting device of this embodiment, the two pins 23 and 24 are provided so as to protrude rightward (in the horizontal direction) from the right surface 21a of the base plate 21 on the pallet P, and the connecting rod 22 is provided so as to protrude rightward so as to be movable within the right surface 21a (on the right surface 21a) of the base plate 21. Because of this, the vertical downward load due to the self-weight of the pallet P is supported by the housing 1 via the two pins 23 and 24 and via the support holes 19 and 20, and therefore the vertical downward load is not exerted onto the connecting rod 22. As a result, even if a vertical external force is applied to the pallet P, the driving force of the output member 5 is reliably transmitted to the connecting rod 22 via the balls 16.

Figure 5:
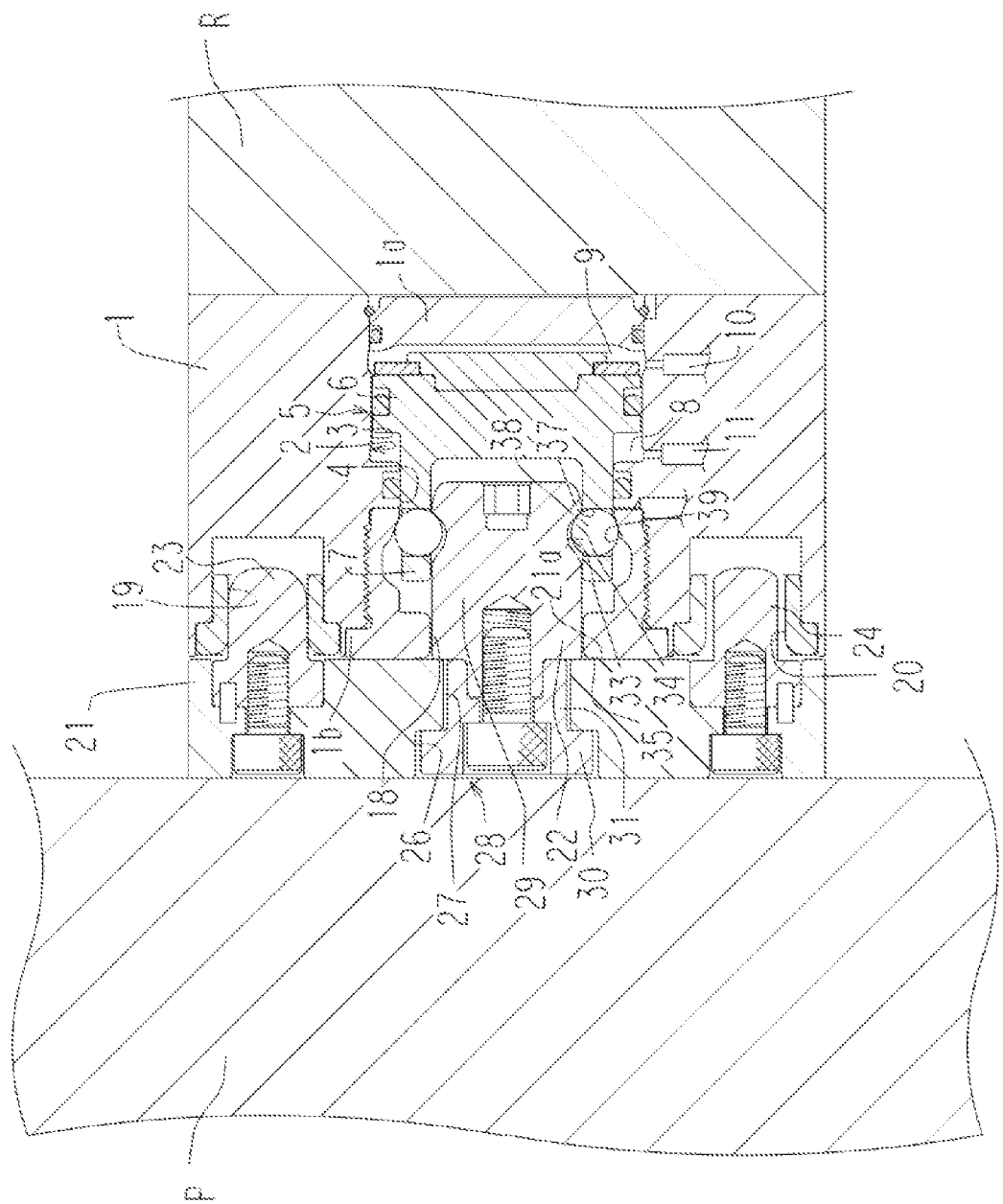
FIG. 5 shows a second embodiment of the present invention, and is a diagram similar to FIG. 3.

FIG. 5 shows a second embodiment of the present invention. In the second embodiment, components the same as or similar to the components in the above-described embodiment are given the same reference numerals, in principle.

The modification shown in FIG. 5 is different from the above-described embodiment in the following points.

In the connecting device shown in FIG. 5, the lock chamber 8 is provided to the left of the piston portion 6, and the release chamber 9 is provided to the right of the piston portion 6.

Furthermore, four guide holes 37 are bored through a tubular wall of the tubular operation portion 7 in the radial direction of the cylinder hole 2. It should be noted that only two of the four guide holes 37 are shown in FIG. 5. A ball (engagement member) 38 is inserted in each of the guide holes 37 so as to be movable in the radial direction. A portion of the inner peripheral surface of the cylinder hole 2 is arranged so that the distance in the radial direction between the surface and the axis of the cylinder hole 2 increases leftward (toward the leading end side) in the axial direction. The balls 38 are contactable with a wedge surface (wedge portion) 39 provided on the inner peripheral wall.

Furthermore, the insertion hole 18 is disposed to the left and adjacent to the cylinder hole 2.

The connecting device of the second embodiment does not include the attachment hole 12, the holding spring 13, and the support member 14, which are included in the connecting device of the first embodiment.

The connecting device of the second embodiment operates as follows, as shown in FIG. 5.

In the initial state (release state) of the connecting device, compressed air has been discharged from the lock chamber 8 and compressed air has been supplied to the release chamber 9. Due to this, the leftward pushing force corresponding to the pressure of the compressed air in the release chamber 9 is exerted onto the output member 5 so as to move the output member 5 leftward. This allows the balls 38 to move outward in the radial direction in the respective guide holes 37.

As the robot arm R is moved leftward, the insertion hole 18 of the housing 1 is fitted over the connecting rod 22 of the pallet P from the right and the support holes 19 and 20 are fitted over the pins 23 and 24, respectively.

To cause the connecting device to transition from the release state to the lock state shown in FIG. 5 for locking, compressed air in the release chamber 9 is discharged and compressed air is supplied to the lock chamber 8. As a result, compressed air in the lock chamber 8 at first moves the output member 5 rightward. Then, the balls 38 respectively inserted in the guide holes 37 of the operation portion 7 are also moved rightward relative to the cylinder hole 2, and therefore the wedge surface 39 of the cylinder hole 2 moves the balls 38 inward in the radial direction of the cylinder hole 2. This brings the balls 38 into contact with the engaged portion 34 of the connecting rod 22. Then, as the output member 5 pulls the connecting rod 22 rightward via the balls 38, the right surface 21a of the base plate 21 is pressed against the seating surface 35 of the housing 1. In this way, the connecting device transitions from the release state to the lock state shown in FIG. 5.

To cause the connecting device to transition from the lock state shown in FIG. 5 to the release state for releasing, compressed air in the lock chamber 8 is discharged and compressed air is supplied to the release chamber 9. As a result, compressed air in the release chamber 9 at first moves the output member 5 leftward. Subsequently, gaps are created between the wedge surface 39 of the cylinder hole 2 and the balls 38, and this allows the balls 38 to move outward in the radial direction. In this way, the connecting device transitions from the lock state shown in FIG. 5 to the release state.

The above-described embodiments are changeable as follows.

The first block R may be another conveyance device instead of the robot arm, or may be a pallet, workpiece, mold, and a like. Alternatively, the first block R may be a side wall of a stationary stand such as a table.

The second block P may be a robot arm or another conveyance device, instead of a pallet.

The connecting device of the first embodiment may be arranged so that a release spring is attached in the release chamber 9, instead of the holding spring 13 attached in the lock chamber 8. A single-acting cylinder may be used as a driving means, instead of a double-acting cylinder. Furthermore, a hydraulic cylinder or an electrical actuator may be used instead of the pneumatic cylinder described by way of example.

The base plate 21 may be structured by a portion of the pallet P, instead of attaching the base plate 21 to the pallet P by screwing or the like.

Moreover, it is a matter of course that other changes or alterations can be made on the present invention within the scope of envisagement of one skilled in the art.

REFERENCE SIGNS LIST

R: robot arm (first block); P: pallet (second block); 1: housing; 1b: left wall (leading end wall); 2: cylinder hole; 5: output member; 14: support member; 15: guide hole; 16: ball (engagement member); 17: wedge surface (wedge portion); 18: insertion hole; 19: support hole (first support hole); 20: support hole (second support hole); 21: base plate; 21a: right surface (surface); 22: connecting rod; 23: pin (support member, first support member); 24: pin (support member, second support member); 24a: projecting portion; 37: guide hole; 38: ball (engagement member); 39: wedge surface (wedge portion).

The invention claimed is:

1. A connecting device configured to detachably connect a first block (R) and a second block (P) to each other, the connecting device comprising:
   a cylinder hole (2) provided in a housing (1) to be attached to the first block (R);
   an output member (5) inserted in the cylinder hole (2) so as to be movable in an axial direction of the cylinder hole (2);
   a plurality of engagement members (16, 38) supported by the housing (1) or by the output member (5) so as to be movable in a radial direction of the cylinder hole (2), the engagement members (16, 38) being configured to be moved inward in the radial direction by movement of the output member (5) in the axial direction;
   an insertion hole (18) opening onto a leading end surface of the housing (1);
   at least one support hole (19), (20) provided in the housing (1) so as to extend in parallel to an axial direction of the insertion hole (18);
   a connecting rod (22) provided so as to protrude from a base plate (21) to be attached to a side wall surface of the second block (P), the connecting rod (22) being configured to be movable on a surface (21a) of the base plate (21) and to be insertable into the insertion hole (18);
   an engaged portion (34) provided on an outer peripheral wall of the connecting rod (22) in its circumferential direction so as to be contactable with the engagement members (16, 38); and
   at least one support member (23), (24) provided so as to protrude from the base plate (21) in parallel to an axial direction of the connecting rod (22), the support member (23), (24) being configured to be inserted in the support hole (19), (20).

2. The connecting device according to claim 1, wherein:
   a tubular support member (14) is provided in the cylinder hole (2) so as to protrude from a leading end wall (1b) of the housing (1) toward a base end side in the axial direction;
   guide holes (15) are bored through a tubular wall of the support member (14) in the radial direction of the cylinder hole (2);
   the engagement members (16) are respectively inserted in the guide holes (15) so as to be movable in the radial direction;
   a wedge portion (17) configured to be contactable with the engagement members (16) is provided on an inner peripheral wall of the output member (5); and
   the insertion hole (18), structured by a tubular hole of the support member (14), opens onto the leading end surface of the housing (1).

3. The connecting device according to claim 1, wherein:
   a portion of the output member (5) has a tubular shape, and guide holes (37) are bored through a tubular wall of the output member (5) in the radial direction of the cylinder hole (2);
   the engagement members (38) are respectively inserted in the guide holes (37) so as to be movable in the radial direction; and
   a wedge portion (39) configured to be contactable with the engagement members (38) is provided on an inner peripheral wall of the cylinder hole (2).

4. The connecting device according to claim 1, wherein:
   the at least one support member (23), (24) includes a first support member (23) and a second support member (24), which are provided so as to protrude from the base plate (21) with the connecting rod (22) interposed between the first and second support members (23 and 24);
   the at least one support hole (19), (20) includes a first support hole (19) with a circular hole shape, into which the first support member (23) is to be inserted, and a second support hole (20) with a circular hole shape, into which the second support member (24) is to be inserted;
   the first support member (23) has a cylindrical outer peripheral wall; and
   the second support member (24) has projecting portions (24a) respectively provided on both sides of a cylindrical outer peripheral wall of the second support member (24) in a direction crossing a direction connecting the first support member (23) to the second support member (24).

5. The connecting device according to claim 1, wherein:
the at least one support member (23), (24) includes a first support member (23) and a second support member (24), which are provided so as to protrude from the base plate (21) with the connecting rod (22) interposed between the first and second support members (23 and 24);
the at least one support hole (19), (20) includes a first support hole (19) with a circular hole shape, into which the first support member (23) is to be inserted, and a second support hole (20) with a circular hole shape, into which the second support member (24) is to be inserted;
the first support member (23) has a cylindrical outer peripheral wall; and
the second support member (24) has an oval prism shape, a longitudinal axis of an oval of the oval prism shape extending in a direction crossing a direction connecting the first support member (23) to the second support member (24).

6. The connecting device according to claim 1, wherein:
the at least one support member (23), (24) includes a first support member (23) and a second support member (24), which are provided so as to protrude from the base plate (21) with the connecting rod (22) interposed between the first and second support members (23 and 24);
the at least one support hole (19), (20) includes a first support hole (19) with a circular hole shape, into which the first support member (23) is to be inserted, and a second support hole (20) with an elongated hole shape, into which the second support member (24) is to be inserted, a longitudinal axis of the elongated hole shape extending in a direction connecting the first support hole (19) to the second support hole (20); and
each of the first support member (23) and the second support member (24) has a cylindrical outer peripheral wall.

7. The connecting device according to claim 2, wherein:
the at least one support member (23), (24) includes a first support member (23) and a second support member (24), which are provided so as to protrude from the base plate (21) with the connecting rod (22) interposed between the first and second support members (23 and 24);
the at least one support hole (19), (20) includes a first support hole (19) with a circular hole shape, into which the first support member (23) is to be inserted, and a second support hole (20) with a circular hole shape, into which the second support member (24) is to be inserted;
the first support member (23) has a cylindrical outer peripheral wall; and
the second support member (24) has projecting portions (24*a*) respectively provided on both sides of a cylindrical outer peripheral wall of the second support member (24) in a direction crossing a direction connecting the first support member (23) to the second support member (24).

8. The connecting device according to claim 3, wherein:
the at least one support member (23), (24) includes a first support member (23) and a second support member (24), which are provided so as to protrude from the base plate (21) with the connecting rod (22) interposed between the first and second support members (23 and 24);
the at least one support hole (19), (20) includes a first support hole (19) with a circular hole shape, into which the first support member (23) is to be inserted, and a second support hole (20) with a circular hole shape, into which the second support member (24) is to be inserted;
the first support member (23) has a cylindrical outer peripheral wall; and
the second support member (24) has projecting portions (24*a*) respectively provided on both sides of a cylindrical outer peripheral wall of the second support member (24) in a direction crossing a direction connecting the first support member (23) to the second support member (24).

9. The connecting device according to claim 2, wherein:
the at least one support member (23), (24) includes a first support member (23) and a second support member (24), which are provided so as to protrude from the base plate (21) with the connecting rod (22) interposed between the first and second support members (23 and 24);
the at least one support hole (19), (20) includes a first support hole (19) with a circular hole shape, into which the first support member (23) is to be inserted, and a second support hole (20) with a circular hole shape, into which the second support member (24) is to be inserted;
the first support member (23) has a cylindrical outer peripheral wall; and
the second support member (24) has an oval prism shape, a longitudinal axis of an oval of the oval prism shape extending in a direction crossing a direction connecting the first support member (23) to the second support member (24).

10. The connecting device according to claim 3, wherein:
the at least one support member (23), (24) includes a first support member (23) and a second support member (24), which are provided so as to protrude from the base plate (21) with the connecting rod (22) interposed between the first and second support members (23 and 24);
the at least one support hole (19), (20) includes a first support hole (19) with a circular hole shape, into which the first support member (23) is to be inserted, and a second support hole (20) with a circular hole shape, into which the second support member (24) is to be inserted;
the first support member (23) has a cylindrical outer peripheral wall; and
the second support member (24) has an oval prism shape, a longitudinal axis of an oval of the oval prism shape extending in a direction crossing a direction connecting the first support member (23) to the second support member (24).

11. The connecting device according to claim 2, wherein:
the at least one support member (23), (24) includes a first support member (23) and a second support member (24), which are provided so as to protrude from the base plate (21) with the connecting rod (22) interposed between the first and second support members (23 and 24);
the at least one support hole (19), (20) includes a first support hole (19) with a circular hole shape, into which the first support member (23) is to be inserted, and a second support hole (20) with an elongated hole shape, into which the second support member (24) is to be inserted, a longitudinal axis of the elongated hole shape extending in a direction connecting the first support hole (19) to the second support hole (20); and each of the first support member (23) and the second support member (24) has a cylindrical outer peripheral wall.

12. The connecting device according to claim 3, wherein:

the at least one support member (23), (24) includes a first support member (23) and a second support member (24), which are provided so as to protrude from the base plate (21) with the connecting rod (22) interposed between the first and second support members (23 and 24);

the at least one support hole (19), (20) includes a first support hole (19) with a circular hole shape, into which the first support member (23) is to be inserted, and a second support hole (20) with an elongated hole shape, into which the second support member (24) is to be inserted, a longitudinal axis of the elongated hole shape extending in a direction connecting the first support hole (19) to the second support hole (20); and each of the first support member (23) and the second support member (24) has a cylindrical outer peripheral wall.

\* \* \* \* \*